(12) United States Patent
Maeda et al.

(10) Patent No.: US 11,787,002 B2
(45) Date of Patent: Oct. 17, 2023

(54) SPIRAL CONVEYOR

(71) Applicant: TOKYO SEIMITSU HATSUJO Co.,Ltd., Yokohama Kanagawa (JP)

(72) Inventors: Takaaki Maeda, Yokohama Kanagawa (JP); Sugihide Nakashima, Yokohama Kanagawa (JP)

(73) Assignee: TOKYO SEIMITSU HATSUJO CO., LTD., Yokohama Kanagawa (JP)

( * ) Notice: Subject to any disclaimer, the term of this patent is extended or adjusted under 35 U.S.C. 154(b) by 36 days.

(21) Appl. No.: 17/597,971

(22) PCT Filed: Aug. 18, 2020

(86) PCT No.: PCT/JP2020/031061
§ 371 (c)(1),
(2) Date: Feb. 25, 2022

(87) PCT Pub. No.: WO2021/039485
PCT Pub. Date: Mar. 4, 2021

(65) Prior Publication Data
US 2022/0324073 A1 Oct. 13, 2022

(30) Foreign Application Priority Data
Aug. 28, 2019 (JP) .................. 2019-155313

(51) Int. Cl.
*B23Q 11/00* (2006.01)
*B65G 33/10* (2006.01)
(Continued)

(52) U.S. Cl.
CPC .......... *B23Q 11/0042* (2013.01); *B65G 33/10* (2013.01); *B65G 33/24* (2013.01)

(58) Field of Classification Search
None
See application file for complete search history.

(56) References Cited

U.S. PATENT DOCUMENTS 1,023,888 A * 4/1912 Sorensen ............. B65G 33/265
37/258
2,693,873 A * 11/1954 Martin ................... B65G 33/18
198/657

(Continued)

FOREIGN PATENT DOCUMENTS

JP     59183413 U    12/1984
JP     0364910 U     6/1991
(Continued)

OTHER PUBLICATIONS

International Search Report from PCT/JP2020/031061 dated Oct. 27, 2020, 3 pgs.
http://www.to-hatsu.co.jp/products/sc_built.html. Feb. 18, 2022.

*Primary Examiner* — Kavel Singh
(74) *Attorney, Agent, or Firm* — Tutunjian & Bitetto, P.C.

(57) ABSTRACT

A novel structure of a spiral conveyor is provided which is also suitable for conveyance of curl-shape and permanent-shape cuttings in a lathe system while suppressing the occurrence of noise caused by vibration. At the lowest point, a conveyance spiral of this spiral conveyor for conveying chips contacts the ground (the ground point P) at the lowest point of a tray, and the conveyance spiral is not in contact with a pair of rails in opposite positions on the inner surface of the tray and extending in the length direction, and small gaps t are formed between the conveyance spiral and the rails. Because it is only at the lowest point that the conveyance spiral contacts the tray, similarly to conventional rail-less designs, a low level of noise is achieved, similar to that in the rail-less designs.

7 Claims, 4 Drawing Sheets

(51) Int. Cl.
*B65G 33/24* (2006.01)
*B65G 33/26* (2006.01)

(56) References Cited

U.S. PATENT DOCUMENTS

| | | | | |
|---|---|---|---|---|
| 2,818,165 A | * | 12/1957 | Dupps | B65G 33/32 |
| | | | | 198/673 |
| 3,212,624 A | * | 10/1965 | Hess | B65G 27/00 |
| | | | | 222/196 |
| 4,036,411 A | * | 7/1977 | Westhoff | B65G 33/14 |
| | | | | 222/413 |
| 5,553,534 A | * | 9/1996 | Soavi | B23Q 11/0057 |
| | | | | 100/145 |
| 10,501,266 B2 | * | 12/2019 | Maeda | B23Q 11/00 |
| 10,793,368 B2 | * | 10/2020 | Shiraki | B23Q 11/00 |
| 2017/0036863 A1 | * | 2/2017 | Schinkowsky | B65G 33/24 |

FOREIGN PATENT DOCUMENTS

| | | |
|---|---|---|
| JP | 4-3711 A | 1/1992 |
| JP | 2002-154030 A | 5/2002 |
| JP | 2008-044046 A | 2/2008 |
| JP | 2012-061588 A | 3/2012 |
| JP | 2012-171041 A | 9/2012 |
| JP | 2018-001400 A | 1/2018 |

\* cited by examiner

SPIRAL CONVEYOR

FIELD OF ART

The present invention relates to a spiral conveyor for conveyance of chips or scrapes which are generated in the course of metal cutting process.

BACKGROUND ART

A spiral conveyor 1, which has been known as one kind of various conveyors, is shown by way of example in Patent Document 1, in Non-Patent Document 1 and in FIG. 1, wherein a conveyance spiral member 3 like a coil spring is received in a tray 2 and driven by a motor 4 with a decelerator to be rotated at a low speed in a predetermined direction, thereby conveying scrapes 5 thrown into the tray 2 in a predetermined direction within the tray 2, while doing solid-liquid separation, which are then discharged toward a discharge duct 6 connected to an exit of the tray 2. Cutting fluid 7 is thrown into the tray 2 together with the scrapes 5, which will fall by gravity while being delivered so that it may be separated from the scrapes and collected in a cutting fluid tank 8 positioned beneath the tray 2.

Such spiral conveyor having the above-described construction has been widely used in various machine tools, because it is capable of smoothly conveying chips or scrapes of various shapes, sizes and materials, from largely-expanded long-chain-shaped continuous chips or scrapes to needle-like fine chips or scrapes, it has a simple structure and may be manufactured and provided at a low cost, it will achieve long-distance conveyance of the chips or scrapes in a machining process wherein various machine tools are connected to each other, it is possible to efficiently separate and collect the cutting fluid which has been adhered to the chips or scrapes, etc.

PRIOR ARTS

Patent Documents

Patent Document 1: Japanese Patent Publication No. 2018-001400

Non-Patent Documents

Non-Patent Document 1: http://www.to-hatsu.co.jp/products/sc_built.html

SUMMARY OF INVENTION

Problems to be Solved by Invention

Conventional spiral conveyors include a rail-less type and a rail type, either one of which has been used in practice depending upon the application, while considering the respective pros and cons.

The rail-less type is shown in FIG. 4 wherein the conveyance spiral 3 will substantially get into surface-contact (at the contact point P) with the tray 2 over an area having its center at the lowermost point of the rounded bottom portion 2a of the tray 2. This type is not only simple in construction but also has an advantage of small noise generation while the conveyance spiral 3 is in operation. This is because the vibration and noise caused by contact with the conveyance spiral 3 may be well absorbed by the tray 2 that is usually made by soft steel. The rail-less type will be suitably applicable to conveyance of chip-shaped scrapes discharged in main from machining centers. However, when it is used for conveyance of relatively long-continuous scrapes of complicated shapes such as spiral-shaped and/or curled ones which would be discharged in lathe systems, the scrapes could cling to the conveyance spiral 3. The scrapes clung thereto will only move together with rotation of the conveyance spiral 3 but stay at the same position beyond the contact point P1 in the direction of conveyance. This may often cause clogging.

On the other hand, the rail type is shown in FIG. 5 wherein a pair of continuous rails 9, 9 are secured to the inner wall of the tray 2 at opposite positions along the lengthwise direction of the tray 2, the conveyance spiral 3 being supported on the rails 9, 9. The rails 9, 9 are made usually by hardened steel and shaped in substantially trapezoidal cross-section. The conveyance spiral 3 is in contact with the lower edge portions of the rails 9, 9 at the contact points P2, P2 so that it will keep afloat from the lowermost point of the rounded bottom portion 2a of the tray 2 with a small gap t1 (of the order of 1 mm, for example) therebetween.

The rail type is suitable not only for conveyance of chip-shaped scrapes discharged in the machining centers but also for conveyance of curled or permanent-shaped scrapes discharged in the lathe systems. When such scrapes become entangled with the conveyance spiral 3, they would tend to stay at some position before the contact points P2, P2 in the direction of rotation of the spiral. Nevertheless, the conveyance spiral 3 has a lead angle (that is an inclination of the spiral), which will convey the entangled scrapes by force. This means that the rail type has a strong point of providing high capacity of conveyance for every kind of scrapes. On the other hand, the conveyance spiral 3 and the tray 2 are always in contact with each other at the two contact points P2, P2 and the contact noise is amplified by the tray 2 made of hard material, thereby increasing noise generation while the conveyance spiral 3 is being driven, which will be a weak point of this type. Further, there will be a gap between the conveyance spiral 3 and the lowermost point (a vertex of the arc) of the rounded bottom portion 2a of the tray 2, so that a certain amount of the non-conveyed scrapes could remain in the said gap, which will be another weak point.

As can be understood from the foregoing description, the rail-less type (FIG. 4) and the rail type (FIG. 5) have pros and cons respectively. Although the rail-less type is beneficial in view of its low noise generation during operation of the conveyance spiral, this could cause clogging when used for conveyance of scrapes such as spiral-shaped and/or curled ones to be produced in lathe systems. The rail type could be used for solving this problem, but it would generate larger noise, falling in a dilemma.

Accordingly, the problem to be solved by the present invention is, based on consideration of the above-described backgrounds, to provide a spiral conveyor having a novel structure that can suppress the noise generation during operation of the spiral to the same level as by the rail-less type, which is also suitable to conveyance of scrapes such as spiral-shaped and/or curled ones to be produced in lathe systems.

Means for Solving the Problems

To solve the above-described problem, according to claim 1 of the present invention, there is provided a spiral conveyor comprising a tray having substantially U-shaped cross-section and including a pair of continuous rails extending in a lengthwise direction at opposition positions on the inner wall thereof, a conveyance spiral contained in the tray, and drive means for driving the conveyance spiral to rotate in a predetermined direction, so that the rotating conveyance spiral conveys scrapes thrown into the tray in a predetermined direction, wherein it is characterized in that the conveyance spiral is in contact, at its lowermost point thereof, with a lowermost point of the tray, while being out of contact with the rails with small gaps therebetween.

According to claim 2 of the present invention, in the spiral conveyor of claim 1, it is characterized in that each rails has a lower edge portion on an inner surface thereof, each small gap being formed between an outer periphery of the conveyance spiral and the edge portion.

According to claim 3 of the present invention, in the spiral conveyor of claim 1 or 2, it is characterized in that each small gap is less than 1 mm.

According to claim 4 of the present invention, in the spiral conveyor of any one of claims 1 to 3, it is characterized in that the tray is formed to have substantially a U-shaped cross-section including a rounded bottom portion extending over a predetermined area including a contact point with the conveyance spiral, first inclined portions extending from opposite ends of the rounded bottom portion in obliquely outward and upward directions, vertical portions extending upward from the respective upper ends of the first inclined portions, and second inclined portions extending from the respective upper ends of the vertical portions in obliquely outward and upward directions.

According to claim 5 of the present invention, in the spiral conveyor of claim 4, the rails are secured to the inner walls of the tray at position adjacent to the upper ends of the first inclined portions or to the inner walls of the vertical portions.

According to claim 6 of the present invention, in the spiral conveyor of any one of claims 1 to 5, it is characterized in that a metal plate extends along the inner wall of the tray between the rails, and a vibration dampening member is inserted between the inner wall of the tray and the metal plate.

According to claim 7 of the present invention, in the spiral conveyor of claim 6, it is characterized in that opposite end portions of the vibration dampening member are folded upwardly to extend along the inner side walls of the rails, opposite ends of the metal plate being in contact with the upward-folded portions to keep the metal plate out-of-contact with the rails.

Advantages of Invention

In accordance with the present invention, it is possible to provide a novel structure of a spiral conveyor capable of suppressing the noise generation during operation of the spiral to the same level as by the rail-less type, which is also suitable not only to conveyance of chip-shaped scrapes to be discharged from the machining centers but also to conveyance of relatively long-continuous scrapes of complicated shapes such as spiral-shaped and/or curled ones to be discharged in lathe systems.

EMBODIMENTS OF INVENTION

Figure 1:
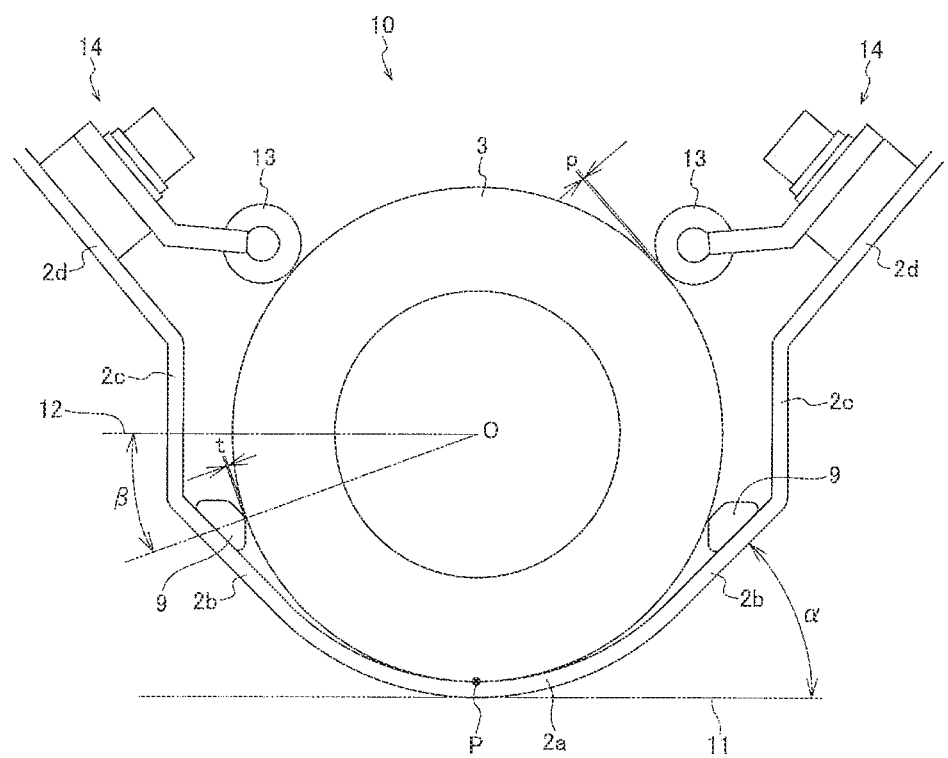
FIG. 1 a front view showing a spiral conveyor according to an embodiment of the present invention.

A spiral conveyor according to an embodiment of the present invention will be described by particularly referring to FIG. 2. This spiral conveyor 10 has the same basic structure as that of the spiral conveyor 1 of FIG. 1 and its basic operation and function is also the same as having been described in connection with FIG. 1, but has unique positional and structural relationship between the tray 12 and the conveyance spiral 13.

More specifically, the conveyance spiral 3 is in substantially planar contact with the tray 2 over a certain area including the lowermost point of the rounded bottom portion 2a (at the contact point P). Although a pair of continuous rails 9, 9 are secured to the inner wall of the tray 2 at opposite positions along the lengthwise direction of the tray 2, the conveyance spiral 3 being supported on the rails 9, 9, the non-driven conveyance spiral 3 keeps out of contact from the rails 9, 9 to form small gaps (t) respectively therebetween.

Figure 4:
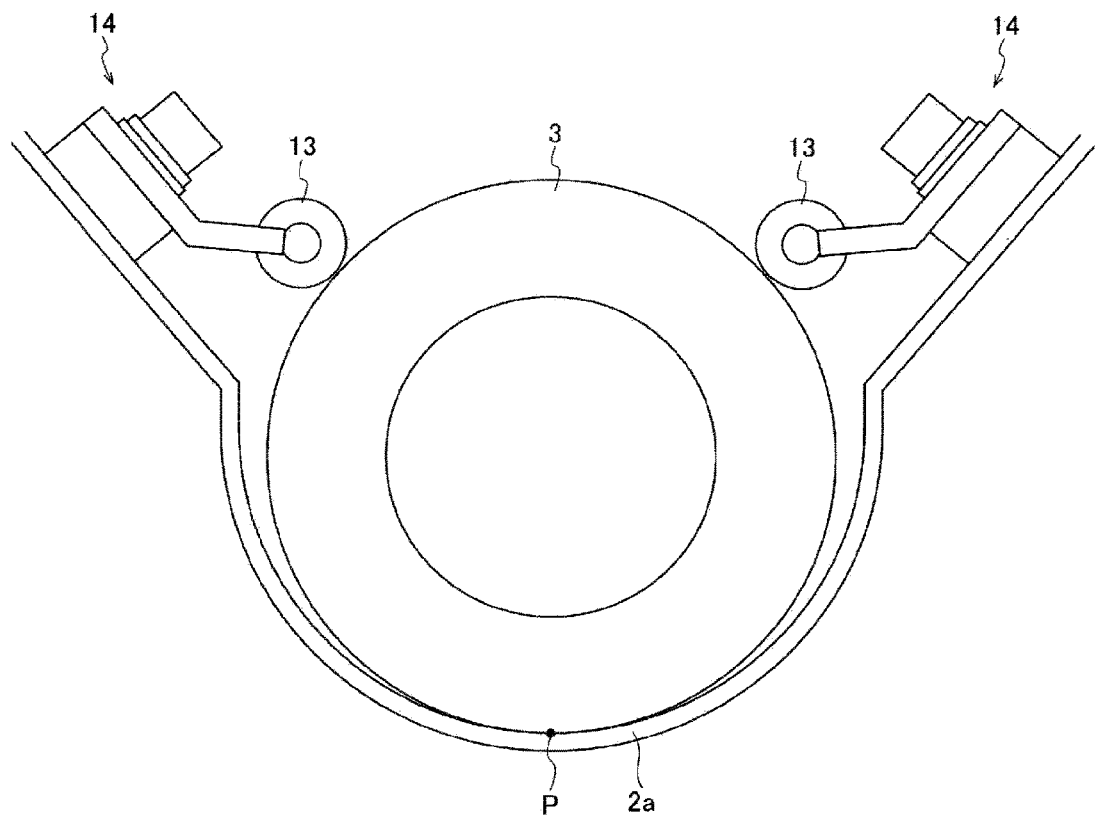
FIG. 4 a cross-section of the similar part of a spiral conveyor of a conventional rail-less type, particularly showing positional and structural relationship between the tray and the conveyance spiral.
Figure 5:
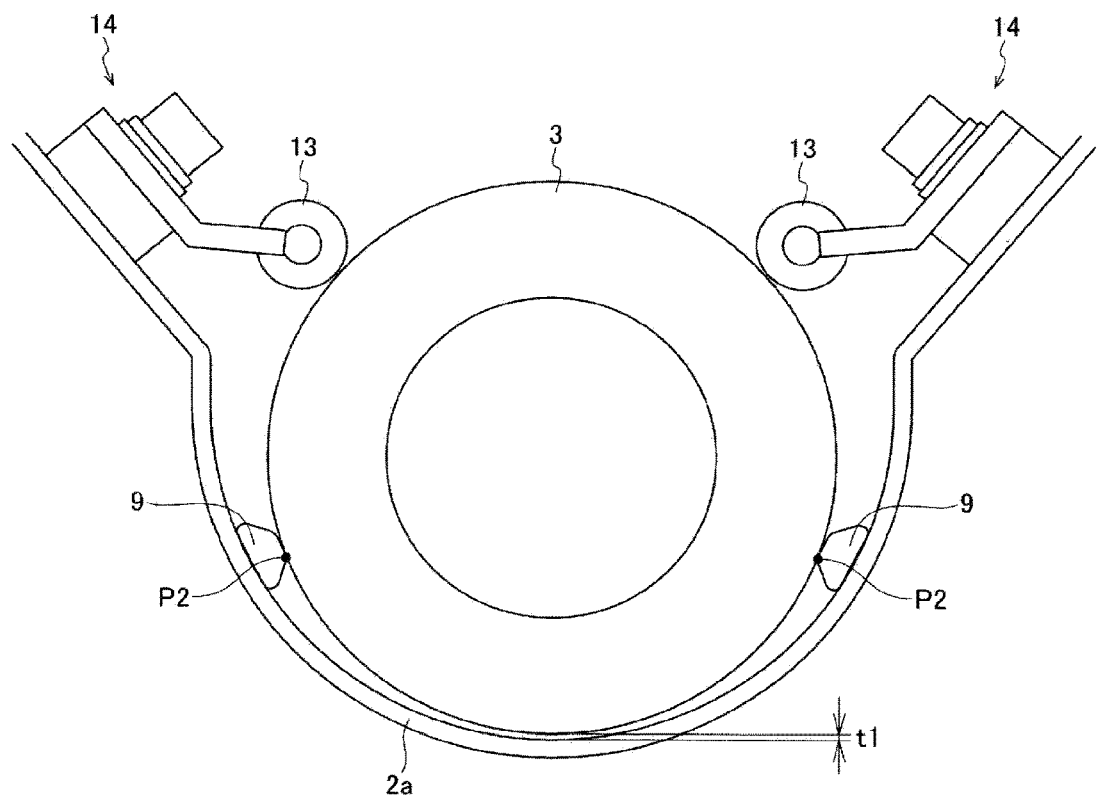
FIG. 5 a cross-section of the similar part of a spiral conveyor of a conventional rail type, particularly showing positional and structural relationship between the tray and the conveyance spiral.
Figure 1:
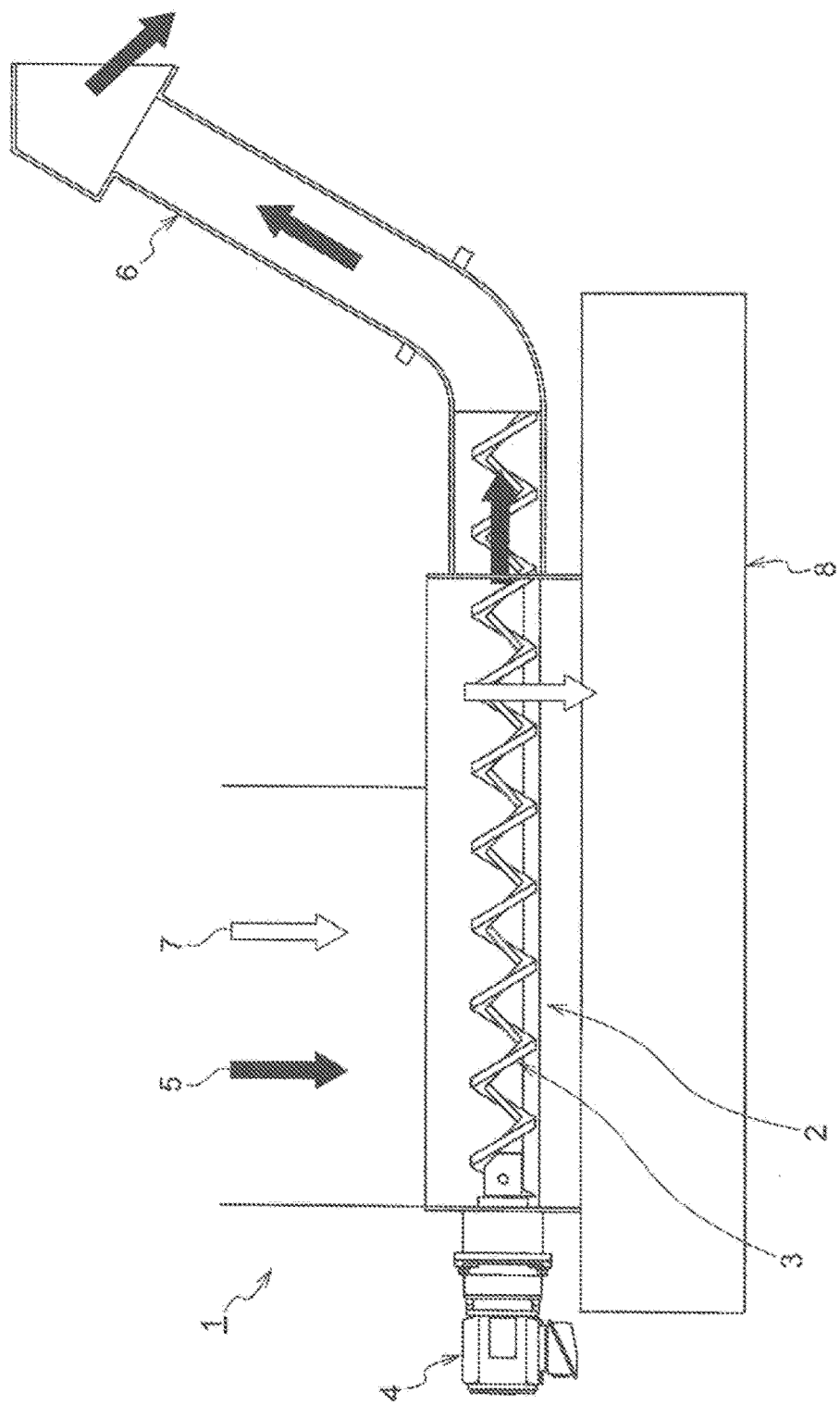

In this type, when strictly speaking, the conveyance spiral 3 will become point contact with the lowermost point of the tray 2 at the contact point P. However, there is only a little difference between curvature of the conveyance spiral 2 and the tray rounded bottom portion 2a, it will be in substantially planer contact over a certain area including the lowermost point of the rounded bottom portion 2a. This will be in common with the conventional rail-less type (FIG. 4) but differ therefrom in that the rails 9, 9 has particular positional relationship (non-contact and with small gaps (t) with the conveyance spiral 3. On the other hand, this type will be in common with the conventional rail type (FIG. 5) in that the rails 9, 9 are secured to the inner wall of the tray 2 at opposite positions along the lengthwise direction of the tray 2 but differ therefrom in that the conveyance spiral 3 keeps out of contact with these rails 9, 9 and becomes in contact with the lowermost point (a vertex of the arc) of the rounded bottom portion 2a of the tray 2. Accordingly, this type has a unique structure which is different from both of the conventional rail-less type (FIG. 4) and the conventional rail type (FIG. 5).

The embodiment shown in FIG. 2 will now be described in more detail. The tray 2 is formed to have substantially the U-shaped cross-section including a rounded bottom portion 2a extending over a predetermined area including a contact point P with the conveyance spiral 3, first inclined portions 2b, 2b extending from the opposite ends of this portion in obliquely outward and upward directions, vertical portions 2c, 2c extending upward from the respective upper ends of the first inclined portions 2b, 2b, and second inclined portions 2d, 2d extending from the respective upper ends of the vertical portions 2c, 2c in obliquely outward and upward directions. The rails 9, 9 extending in a lengthwise direction of the tray 2 are secured to the inner walls of the inclined portions 2b, 2b. In this embodiment, an angle between the floor 11 on which the tray 2 is mounted and each of the first inclined portions 2b, 2b is 45 degrees.

The rails 9, 9 have substantially a reverse trapezoidal cross-section similar to the rails 9, 9 of the conventional rail type (FIG. 5), which is out of contact with the conveyance spiral 3 to leave small gaps (t) from the inside lower edges (at the points on the outer periphery of the conveyance spiral 3 being closest to the rails 9, 9) of the rails 9, 9. In this embodiment, the inside lower edges of the rails 9, 9 are located at points on planes having an angle β of 20 degrees with respect to a horizontal plane passing through the center O of the conveyance spiral 3, in direction toward the contact point P. In this embodiment, the small gaps (t) are 0.4 mm width, which may also be anyone less than 1.0 mm width. By forming the small gaps (t) of such width, when the scrapes become entangled with the conveyance spiral 3, it would be deformed and decentered to become intermittent contact with one of the rails 9. As such, that this type will be highly capable of forcibly conveying the entangled scrapes. This capability could not be achievable if the gaps (t) should be of 1 mm of greater, because even when the scrapes become entangled with the conveyance spiral 3 so that it becomes deformed and decentered, it could not become contact with either one of the rails 9. Although the small gaps (t) should theoretically be as small as closer to zero, the gap (t) is designed to have 0.4 mm width in this embodiment by considering dimensional accuracy of the various parts concerned.

Figure 2:
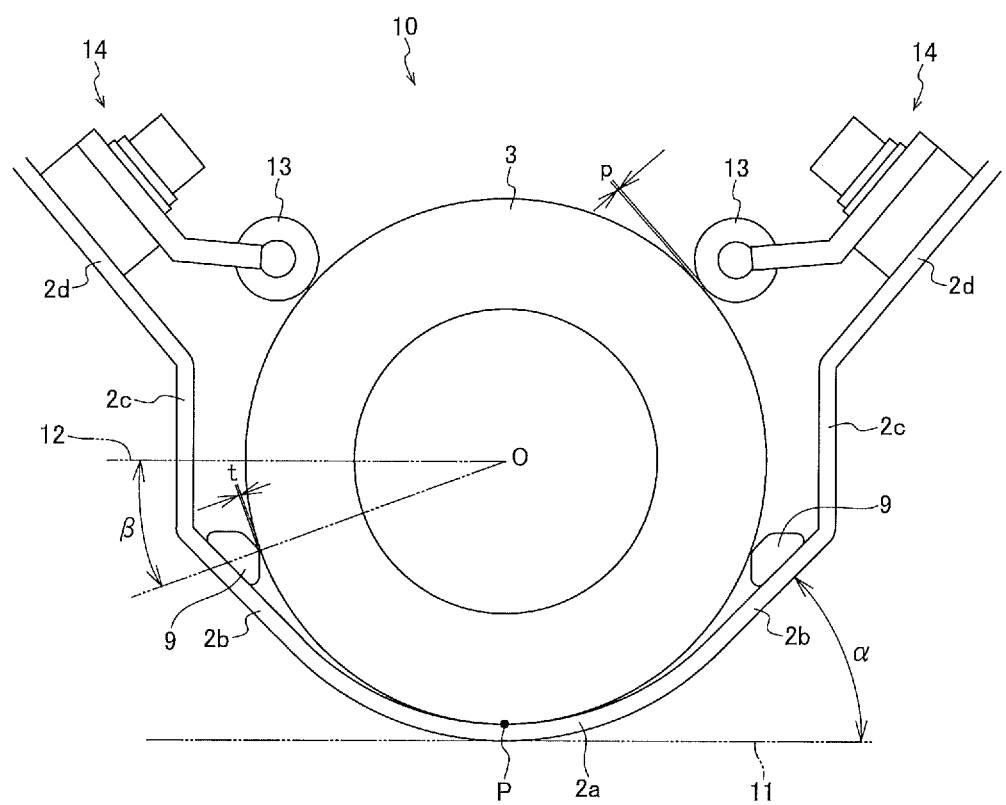
FIG. 2 a cross-section of an essential part of this spiral conveyor, particularly showing positional and structural relationship between the tray and the conveyance spiral.

Reference numerals 13 in FIG. 2 are given to a press roller for prevention of excessive floating-up of the conveyance spiral 3 while being driven, which, in this embodiment, are rotatably mounted to the inner walls of the second inclined portions 2d, 2d of the tray 2 via attachments 14, 14. There are small gaps (p) between the press rollers 13, 13 and the non-driven conveyance spirals 3, 3, which is 0.5 mm in this embodiment. The conventional rail-less type (FIG. 4) and the conventional rail type (FIG. 5) also have press rollers 13, 13.

Next, we conducted a test for confirming noise generation by the type of the embodiment (FIG. 2) in comparison with the conventional rail-less type (FIG. 4) and the conventional rail type (FIG. 5). As for the respective types, the conveyance spiral 3 of 2 meter length was used to prepare sample spiral conveyor, that is, a spiral conveyor A (L=2 m) by using a single one of the conveyance spiral, and another spiral conveyor B (L=4 m) by using a pair of the conveyance spiral to be connected with each other in a lengthwise direction. The respective sample conveyors were mounted on platforms at 600 mm height and the respective conveyance spirals were driven to rotate. Noise generation was measure by using noise level meters at position higher than the floor by 1 meter, remote from the spiral conveyors by 0.7 meter aside at the middle of the total length of the spiral conveyors. The results are shown in Table 1.

TABLE 1

| spiral conveyor | type | noise (dBA) |
| --- | --- | --- |
| A (L = 2 m) | rail-less (FIG. 3) | 51-54 |
| A (L = 2 m) | rail (FIG. 4) | 60-67 |
| A (L = 2 m) | this embodiment (FIG. 2) | 50-54 |
| B (L = 4 m) | rail-less (FIG. 3) | 55-59 |
| B (L = 4 m) | rail (FIG. 4) | 65-73 |
| B (L = 4 m) | this embodiment (FIG. 2) | 56-59 |

As shown in this table, it can be confirmed that the noise generation level of the type of the embodiment (FIG. 2) is substantially equal to that of the conventional rail-less type (FIG. 4) and much lower than that of the conventional rail type (FIG. 5).

In addition, we have tested to convey various kinds of scrapes with the respective spiral conveyors. As having been written in the prior art description, when the rail-less type (FIG. 4) was used for conveyance of relatively long-continuous scrapes of complicated shapes such as spiral-shaped and/or curled ones which would be discharged in lathe systems, the scrapes entangled with the conveyance spiral 3 were merely moved to rotate together with the conveyance spiral 3 but stayed at the same position beyond the contact point P1 in the direction of conveyance, which often caused clogging. On the contrary, when this embodiment (FIG. 2) was used, similar to the rail type (FIG. 5), such entangled scrapes have been forcibly conveyed by cooperation of the conveyance spiral 3 and the rails 9 to cause no clogging.

Although the present invention has been described in detail in reference to the embodiment illustrated herein, it is not limited thereto and may be implemented in various modifications and applications within a scope of invention to be defined based on the appended claims.

For example, the various design items referred to in the illustrated embodiment (such as shape of the tray 2, position of the rails 9, 9, dimension of the gaps (t) and (p), angles α and β) are merely examples and may be changed or varied while not departing from the characteristic features of the present invention.

The spiral conveyor of the illustrated embodiment is shown as a type wherein the conveyance spiral 3 is a hollow one having no center axis, but the present invention is also applicable to another type spiral conveyor wherein the conveyance spiral has a center axis.

The spiral conveyor 1 shown in FIG. 1 includes the discharge duct 6 connected to the exit of the tray 2 so that the scrapes are transported upward in an oblique direction, but the present invention is also applicable to another type spiral conveyor having no such discharge duct (or lift-up duct).

Figure 3:
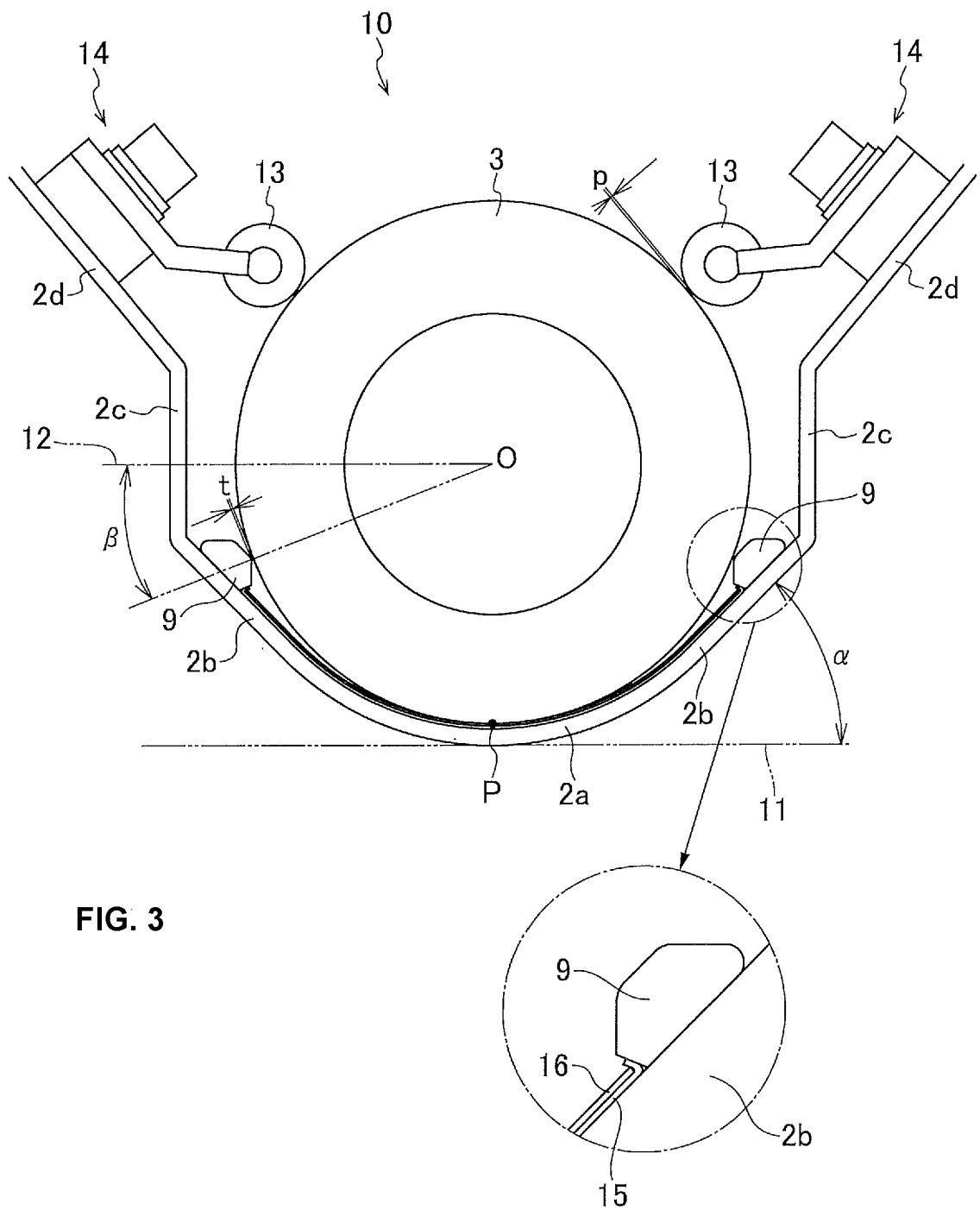
FIG. 3 a cross-section of the similar part of a spiral conveyor according to an embodiment modified from FIG. 2.

To improve vibration dampening effects, a vibration dampening member 15 made of NBR, for example, with a thin metal plate 16 such as stainless steel plate limited thereon may be inserted between the rails 9, 9 along the inner wall of the rounded bottom portion 2a of the tray, as shown in FIG. 3. As shown in the same figure on an enlarged scale, the opposite end portions of the vibration dampening member 15 are folded upwardly to extend along the inner side walls of the rails 9, 9 and the opposite ends of the metal plate 19 becomes in contact with the upward-folded portions, so that the metal plate 16 will be out-of-contact with the rails 9, 9, thereby preventing propagation of vibration to the tray 2.

Furthermore, they may be designed to be exchangeable, thereby suppressing abrasion and damage of the tray 2 itself. When the vibration dampening member 15 and/or the metal plate 16 should become damaged, they may be exchanged to fresh ones. Such a design will contribute to cost saving.

It is also possible that the present invention includes an additional feature that a vibration dampening member is inserted between the outer tray and the inner tray, as disclosed in Patent Document 1. This will further improve the vibration dampening effects.

LEGENDS 1 spiral conveyor
2 tray 2a rounded bottom portion
2b first inclined portion
2c vertical portion
2d second inclined portion
3 conveyance spiral
4 motor with deceleration mechanism
5 chips or scrapes
6 discharge duct
7 cutting fluid
8 cutting fluid tank
9 rail
10 spiral conveyor
11 floor
12 horizontal plane passing through the center of the conveyance spiral
13 press roller
14 attachment
15 vibration dampening member
16 metal plate

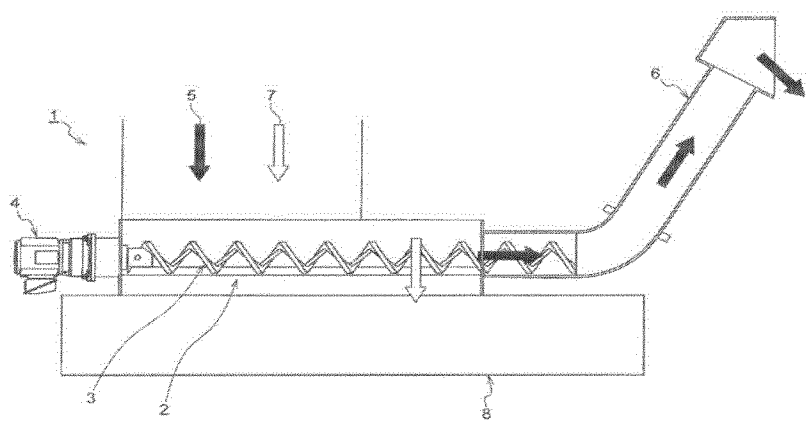

The invention claimed is:

1. A spiral conveyor comprising:
a tray having substantially U-shaped cross-section and including a pair of continuous rails extending in a lengthwise direction at opposition positions on the inner wall thereof,
a conveyance spiral contained in said tray, and
drive means for driving said conveyance spiral to rotate in a predetermined direction, so that said rotating conveyance spiral conveys scrapes thrown into said tray in a predetermined direction, wherein said conveyance spiral is in contact, at its lowermost point thereof, with a lowermost point of said tray, while being out of contact with said rails with small gaps therebetween.

2. The spiral conveyor according to claim 1, wherein each of said rails has a lower edge portion on an inner surface thereof, each of said small gaps being formed between an outer periphery of said conveyance spiral and said edge portion.

3. The spiral conveyor according to claim 1, wherein each of said small gaps is less than 1 mm.

4. A spiral conveyor according to any one of claim 1, wherein said tray is formed to have substantially a U-shaped cross-section including a rounded bottom portion extending over a predetermined area including a contact point with said conveyance spiral, first inclined portions extending from opposite ends of said rounded bottom portion in obliquely outward and upward directions, vertical portions extending upward from the respective upper ends of said first inclined portions, and second inclined portions extending from the respective upper ends of said vertical portions in obliquely outward and upward directions.

5. The spiral conveyor according to claim 4, wherein said rails are secured to the inner walls of said tray at position adjacent to said upper ends of said first inclined portions or to the inner walls of said vertical portions.

6. The spiral conveyor according to any one of claim 1, further comprising a metal plate extending along the inner wall of said tray between said rails, and a vibration dampening member inserted between the inner wall of said tray and said metal plate.

7. The spiral conveyor according to claim 6, wherein opposite end portions of said vibration dampening member are folded upwardly to extend along the inner side walls of said rails, opposite ends of said metal plate being in contact with said upward-folded portions to keep said metal plate out-of-contact with said rails.

\* \* \* \* \*

UNITED STATES PATENT AND TRADEMARK OFFICE
CERTIFICATE OF CORRECTION

| | |
|---|---|
| PATENT NO. | : 11,787,002 B2 |
| APPLICATION NO. | : 17/597971 |
| DATED | : October 17, 2023 |
| INVENTOR(S) | : Takaaki Maeda et al. |

It is certified that error appears in the above-identified patent and that said Letters Patent is hereby corrected as shown below:

On the Title Page

Delete the title page and substitute therefore with the attached title page consisting of the corrected illustrative figure(s).

In the Drawings

Please replace FIG. 1 with FIG. 1 as shown on the attached pages.

Signed and Sealed this
Thirtieth Day of January, 2024

Katherine Kelly Vidal
*Director of the United States Patent and Trademark Office*

(12) United States Patent
Maeda et al.

(10) Patent No.: US 11,787,002 B2
(45) Date of Patent: Oct. 17, 2023

(54) SPIRAL CONVEYOR

(71) Applicant: TOKYO SEIMITSU HATSUJO Co.,Ltd., Yokohama Kanagawa (JP)

(72) Inventors: Takaaki Maeda, Yokohama Kanagawa (JP); Sugihide Nakashima, Yokohama Kanagawa (JP)

(73) Assignee: TOKYO SEIMITSU HATSUJO CO., LTD., Yokohama Kanagawa (JP)

(*) Notice: Subject to any disclaimer, the term of this patent is extended or adjusted under 35 U.S.C. 154(b) by 36 days.

(21) Appl. No.: 17/597,971

(22) PCT Filed: Aug. 18, 2020

(86) PCT No.: PCT/JP2020/031061
§ 371 (c)(1),
(2) Date: Feb. 25, 2022

(87) PCT Pub. No.: WO2021/039485
PCT Pub. Date: Mar. 4, 2021

(65) Prior Publication Data
US 2022/0324073 A1     Oct. 13, 2022

(30) Foreign Application Priority Data

Aug. 28, 2019   (JP) .............................. 2019-155313

(51) Int. Cl.
*B23Q 11/00*   (2006.01)
*B65G 33/10*   (2006.01)
(Continued)

(52) U.S. Cl.
CPC .......... *B23Q 11/0042* (2013.01); *B65G 33/10* (2013.01); *B65G 33/24* (2013.01)

(58) Field of Classification Search
None
See application file for complete search history.

(56) References Cited

U.S. PATENT DOCUMENTS 1,023,888 A * 4/1912 Sorensen ............. B65G 33/265
37/258
2,693,873 A * 11/1954 Martin .................. B65G 33/18
198/657
(Continued)

FOREIGN PATENT DOCUMENTS

JP      59183413 U     12/1984
JP      0364910 U      6/1991
(Continued)

OTHER PUBLICATIONS

International Search Report from PCT/JP2020/031061 dated Oct. 27, 2020, 3 pgs.
http://www.to-hatsu.co.jp/products/sc_built.html. Feb. 18, 2022.

*Primary Examiner* — Kavel Singh
(74) *Attorney, Agent, or Firm* — Tutunjian & Bitetto, P.C.

(57) ABSTRACT

A novel structure of a spiral conveyor is provided which is also suitable for conveyance of curl-shape and permanent-shape cuttings in a lathe system while suppressing the occurrence of noise caused by vibration. At the lowest point, a conveyance spiral of this spiral conveyor for conveying chips contacts the ground (the ground point P) at the lowest point of a tray, and the conveyance spiral is not in contact with a pair of rails in opposite positions on the inner surface of the tray and extending in the length direction, and small gaps t are formed between the conveyance spiral and the rails. Because it is only at the lowest point that the conveyance spiral contacts the tray, similarly to conventional rail-less designs, a low level of noise is achieved, similar to that in the rail-less designs.

7 Claims, 4 Drawing Sheets